US005204306A

United States Patent [19]

Frame et al.

[11] Patent Number: 5,204,306
[45] Date of Patent: * Apr. 20, 1993

[54] CAUSTIC FREE CATALYST FOR USE IN A LIQUID/LIQUID PROCESS FOR SWEETENING A SOUR HYDROCARBON FRACTION

[75] Inventors: Robert R. Frame, Glenview; Jeffery C. Bricker, Buffalo Grove; Laurence O. Stine, Western Springs; Thomas A. Verachtert, Wheeling, all of Ill.

[73] Assignee: UOP, Des Plaines, Ill.

[*] Notice: The portion of the term of this patent subsequent to Mar. 3, 2009 has been disclaimed.

[21] Appl. No.: 799,795

[22] Filed: Nov. 29, 1991

Related U.S. Application Data

[63] Continuation-in-part of Ser. No. 572,824, Aug. 27, 1990, Pat. No. 5,093,296.

[51] Int. Cl.$^5$ .............................................. B01J 31/12
[52] U.S. Cl. ..................... 502/155; 502/163; 502/164; 502/167
[58] Field of Search ................ 502/155, 163, 164, 167

[56] References Cited

U.S. PATENT DOCUMENTS

| | | | |
|---|---|---|---|
| 2,918,426 | 12/1959 | Quiquerez et al. | 208/206 |
| 2,966,453 | 12/1960 | Gleim et al. | 208/206 |
| 2,999,806 | 9/1961 | Thompson | 208/206 |
| 3,252,892 | 5/1966 | Gleim | 208/206 |
| 3,980,582 | 9/1976 | Anderson, Jr. et al. | 252/428 |
| 4,019,869 | 4/1977 | Morris | 23/288 |
| 4,124,494 | 11/1978 | Frame | 208/207 |
| 4,156,641 | 5/1979 | Frame | 208/206 |
| 4,201,626 | 5/1980 | Asdigian | 196/14.52 |
| 4,203,827 | 5/1980 | Frame | 208/206 |
| 4,260,479 | 4/1981 | Frame | 208/207 |
| 4,290,913 | 9/1981 | Frame | 252/428 |
| 4,491,565 | 1/1985 | Verachtert | 422/256 |
| 4,753,722 | 1/1988 | Le et al. | 208/207 |
| 4,824,818 | 4/1989 | Bricker et al. | 502/163 |
| 4,908,122 | 3/1990 | Frame et al. | 208/207 |
| 4,913,802 | 4/1990 | Bricker et al. | 208/207 |
| 4,923,596 | 5/1990 | Bricker et al. | 208/207 |
| 5,093,296 | 3/1992 | Frame et al. | 502/155 |

Primary Examiner—Patrick P. Garvin
Assistant Examiner—Brent M. Peebles
Attorney, Agent, or Firm—Thomas K. McBride; Eugene I. Snyder; Frank S. Molinaro

[57] ABSTRACT

This invention relates to a catalyst which is useful in oxidizing mercaptans present in a sour hydrocarbon fraction. The catalyst consists of an aqueous solution containing ammonium hydroxide, a metal chelate and an onium compound selected from the group consisting of quaternary ammonium, phosphonium, arsonium, stibonium, oxonium and sulfonium compounds. The counter ion of the onium compound is halide, nitrate, sulfate, phosphate, acetate, citrate and tartrate. The catalyst is used in a liquid-liquid process to sweeten a sour hydrocarbon fraction.

6 Claims, No Drawings

CAUSTIC FREE CATALYST FOR USE IN A LIQUID/LIQUID PROCESS FOR SWEETENING A SOUR HYDROCARBON FRACTION

CROSS REFERENCE TO RELATED APPLICATION

This application is a continuation-in-part of prior copending application, Ser. No. 07/572,824 filed on Aug. 27, 1990, now U.S. Pat. No. 5,093,296.

BACKGROUND OF THE INVENTION

Processes for the treatment of a sour hydrocarbon fraction where the fraction is treated by contacting it with an oxidation catalyst and an alkaline agent in the presence of an oxidizing agent at reaction conditions have become well known and widely practiced in the petroleum refining industry. These processes are typically designed to effect the oxidation of offensive mercaptans contained in a sour hydrocarbon fraction to innocuous disulfides—a process commonly referred to as sweetening. The oxidizing agent is most often air. Gasoline, including natural, straight run and cracked gasolines, is the most frequently treated sour hydrocarbon fraction. Other sour hydrocarbon fractions which can be treated include the normally gaseous petroleum fraction as well as naphtha, kerosine, jet fuel, fuel oil, and the like.

A commonly used continuous process for treating sour hydrocarbon fractions entails contacting the fraction with a metal phthalocyanine catalyst dispersed in an aqueous caustic solution to yield a doctor sweet product. The sour fraction and the catalyst containing aqueous caustic solution provide a liquid-liquid system wherein mercaptans are converted to disulfides at the interface of the immiscible solutions in the presence of an oxidizing agent-usually air. The prior art shows that catalysts such as metal phthalocyanines and metal porphyrins can be used to oxidize the mercaptans in a liquid/liquid system. See, U.S. Pat. Nos. 2,999,806 and 2,966,453, respectively.

Although the above processes have shown commercial success, there are problems associated with the use of alkaline agents. One problem is that phenols and cresols present in the hydrocarbon stream are extracted into the aqueous alkaline solution. Since phenol is on the EPA list of hazardous compounds, the solution containing the phenols is considered a hazardous waste and must be disposed of according to EPA procedures. Also because of the presence of alkali metals, the aqueous waste stream often cannot be re-used in other parts of the refinery owing to possible contamination of vessels or catalysts with the alkali metals.

Applicants have found that a sour hydrocarbon fraction can be sweetened by using an aqueous solution containing ammonium hydroxide, an onium compound and a metal chelate. Onium compounds are quaternary ammonium compounds, phosphonium compounds, arsonium compounds, etc. A preferred onium compound is a quaternary ammonium compound with a preferred quaternary ammonium compound being a quaternary ammonium chloride. Quaternary ammonium compounds, and onium compounds in general, have been used in sweetening sour hydrocarbon fractions in conjunction with fixed bed catalysts, e.g., a metal phthalocyanine deposited on an activated charcoal. See, e.g., U.S. Pat. Nos. 4,156,641, 4,124,494, 4,260,479 and 4,203,827. Further, U.S. Pat. No. 4,923,596 discloses the use of quaternary ammonium compounds in a liquid/liquid system using a caustic solution.

Finally, the use of ammonium hydroxide has been disclosed in the prior art, but only as it relates to a fixed bed system. For example, U.S. Pat. No. 4,913,802 discloses the use of ammonium hydroxide and a quaternary ammonium hydroxide in conjunction with a metal chelate dispersed on a support. Similarly, U.S. Pat. No. 4,908,122 discloses the use of ammonium hydroxide and a quaternary ammonium salt other than hydroxide in conjunction with a metal chelate dispersed on a support.

There is no hint nor suggestion in any of the prior art that an aqueous solution containing a metal chelate, ammonium hydroxide and an onium compound can be used to sweeten a sour hydrocarbon fraction. Although U.S. Pat. No. 2,966,453 mentions that ammonium hydroxide can be used to prepare a solution of a metal porphyrin (column 4, lines 69–71), there is no hint or suggestion that such a solution could be used to treat a sour hydrocarbon fraction to give a doctor sweet product. It is applicants alone who have found that ammonium hydroxide can be substituted for an alkaline solution and still yield a doctor sweet product. In particular, applicants have found that a quaternary ammonium chloride salt has much better activity than a quaternary ammonium hydroxide salt, an unexpected result based on the teachings of the prior art.

SUMMARY OF THE INVENTION

This invention relates to a liquid-liquid process for sweetening a sour hydrocarbon fraction and a catalyst for oxidizing mercaptans. Thus, one broad embodiment of the invention is a process for sweetening a sour hydrocarbon fraction containing mercaptans comprising contacting the hydrocarbon fraction in the presence of an oxidizing agent with an aqueous solution containing ammonium hydroxide, a metal chelate and an onium compound selected from the group consisting of quaternary ammonium, phosphonium, arsonium, stibonium, oxonium, and sulfonium compounds having the formula, $$[R'R''R_yM]^+X^-$$

where R is a hydrocarbon group containing up to about 20 carbon atoms and selected from the group consisting of alkyl, cycloalkyl, aryl, alkaryl, and aralkyl, R' is a straight chain alkyl group containing from about 5 to about 20 carbon atoms, R" is a hydrocarbon group selected from the group consisting of aryl, alkaryl and aralkyl, M is nitrogen, phosphorus, arsenic, antimony, oxygen or sulfur, X is an anion selected from the group consisting of halide, hydroxide, nitrate, sulfate, phosphate, acetate, citrate and tartrate, and y is 1 when M is oxygen or sulfur and y is 2 when M is phosphorus, arsenic, antimony or nitrogen.

Another embodiment of the invention is a catalyst effective in oxidizing mercaptans contained in a sour hydrocarbon fraction to disulfides comprising ammonium hydroxide, a metal chelate and an onium compound dispersed in water, the onium compound selected from the group consisting of ammonium, phosphonium, arsonium, stibonium, oxonium and sulfonium compounds having the formula, $$[R'R''R_yM]^+X^-$$

where R is a hydrocarbon group containing up to about 20 carbon atoms and selected from the group consisting of alkyl, cycloalkyl, aryl, alkaryl, and aralkyl, R' is a straight chain alkyl group containing from about 5 to about 20 carbon atoms, R" is a hydrocarbon group selected from the group consisting of aryl, alkaryl and aralkyl, M is nitrogen, phosphorus, arsenic, antimony, oxygen or sulfur, X is an anion selected from the group consisting of halide, hydroxide, nitrate, sulfate, phosphate, acetate, citrate and tartrate, and y is 1 when M is oxygen or sulfur and y is 2 when M is phosphorus, arsenic, antimony or nitrogen.

Yet another embodiment of the invention is a process for improving the activity of a catalyst effective in sweetening a hydrocarbon fraction containing mercaptans, the catalyst comprising a metal chelate dispersed on a solid support, the process comprising adding to the hydrocarbon fraction, under sweetening conditions, an effective amount of an aqueous solution comprising ammonium hydroxide, a metal chelate and an onium compound selected from the group consisting of quaternary ammonium, phosphonium, arsonium, stibonium, oxonium and sulfonium compounds having the formula,

[R'R"R$_y$M]$^+$X$^-$ where R is a hydrocarbon group containing up to about 20 carbon atoms and selected from the group consisting of alkyl, cycloalkyl, aryl, alkaryl, and aralkyl, R' is a straight chain alkyl group containing from about 5 to about 20 carbon atoms, R" is a hydrocarbon group selected from the group consisting of aryl, alkaryl and aralkyl, M is nitrogen, phosphorus, arsenic, antimony, oxygen or sulfur, X is an anion selected from the group consisting of halide, hydroxide, nitrate, sulfate, phosphate, acetate, citrate and tartrate, and y is 1 when M is oxygen or sulfur and y is 2 when M is phosphorus, arsenic, antimony or nitrogen.

Other objects and embodiments of this invention will become apparent in the following detailed description.

DETAILED DESCRIPTION OF THE INVENTION

As stated, this invention relates to a liquid-liquid process for sweetening a sour hydrocarbon fraction and a catalyst for oxidizing mercaptans present in the sour hydrocarbon fraction. The catalyst is an aqueous solution in which are dispersed or dissolved ammonium hydroxide, a metal chelate and an onium compound. The amount of ammonium hydroxide can vary considerably but for convenience varies from about 0.01 to about 30 weight percent of the solution, preferably from about 0.1 to about 10 and most preferably from about 1 to about 10 weight percent.

The metal chelate employed in the practice of this invention can be any of the various metal chelates known to the art as effective in catalyzing the oxidation of mercaptans contained in a sour petroleum distillate, to disulfides or polysulfides. The metal chelates include the metal compounds of tetrapyridinoporphyrazine described in U.S. Pat. No. 3,980,582, e.g., cobalt tetrapyridinoporphyrazine; porphyrin and metaloporphyrin catalysts as described in U.S. Pat. No. 2,966,453, e.g. cobalt tetraphenylporphyrin sulfonate; corrinoid catalysts as described in U.S. Pat. No. 3,252,892, e.g., cobalt corrin sulfonate; chelate organometallic catalysts such as described in U.S. Pat. No. 2,918,426, e.g., the condensation product of an aminophenol and a metal of Group VIII; the metal phthalocyanines as described in U.S. Pat. No. 4,290,913, etc. As stated in U.S. Pat. No. 4,290,913, metal phthalocyanines are a preferred class of metal chelates. All the above-named patents are incorporated herein by reference.

The metal phthalocyanines which can be employed to catalyze the oxidation of mercaptans generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, platinum phthalocyanine, palladium phthalocyanine, copper phthalocyanine, silver phthalocyanine, zinc phthalocyanine, tin phthalocyanine, and the like. Cobalt phthalocyanine and vanadium phthalocyanine are particularly preferred. The ring substituted metal phthalocyanines are generally employed in preference to the unsubstituted metal phthalocyanine (see U.S. Pat. No. 4,290,913), with the sulfonated metal phthalocyanine being especially preferred, e.g., cobalt phthalocyanine monosulfate, cobalt phthalocyanine disulfonate, etc. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine. The concentration of metal chelate and metal phthalocyanine can vary from about 0.1 to about 2000 ppm and preferably from about 50 to about 800 ppm.

Another necessary component of the catalyst is an onium compound. An onium compound is an ionic compound in which the positively charged (cationic) atom is a nonmetallic element other than carbon and which is not bonded to hydrogen. The onium compounds which can be used in this invention are selected from the group consisting of quaternary ammonium, phosphonium, arsonium, stibonium, oxonium and sulfonium compounds, i.e., the cationic atom is nitrogen, phosphorus, arsenic, antimony, oxygen and sulfur, respectively. Table 1 presents the general formula of these onium compounds, and the cationic element.

TABLE 1

| Name and Formula of Onium Compounds | | |
|---|---|---|
| Formula* | Name | Cationic Element |
| R$_4$N$^+$ | quaternary ammonium | nitrogen |
| R$_4$P$^+$ | phosphonium | phosphorous |
| R$_4$As$^+$ | arsonium | arsenic |
| R$_4$Sb$^+$ | stibonium | antimony |
| R$_3$O$^+$ | oxonium | oxygen |
| R$_3$S$^+$ | sulfonium | sulfur |

*R is a hydrocarbon radical.

For the practice of this invention it is desirable that the onium compounds have the formula

[R'R"R$_y$M]$^+$X$^-$ where R is a hydrocarbon group containing up to about 20 carbon atoms and selected from the group consisting of alkyl, cycloalkyl, aryl, alkaryl, and aralkyl, R' is a straight chain alkyl group containing from about 5 to about 20 carbon atoms, R" is a hydrocarbon group selected from the group consisting of aryl, alkaryl and aralkyl, M is nitrogen, phosphorus, arsenic, antimony, oxygen or sulfur, and X is an anion selected from the group consisting of halide, hydroxide, nitrate, sulfate, phosphate, acetate, citrate and tartrate, and y is 1 when M is oxygen or sulfur and y is 2 when M is phosphorus, arsenic, antimony or nitrogen.

Illustrative examples of onium compounds which can be used to practice this invention, but which are not intended to limit the scope of this invention are: benzyldimethylhexadecylphosphonium chloride, benzyldiethyldodecylphosphonium chloride, phenyldimethyldecylphosphonium chloride, trimethyldodecylphosphonium chloride, naphthyldipropylhexadecyl phosphonium chloride, benzyldibutyldecylphosphonium chloride, benzyldimethylhexadecylphosphonium hydroxide, trimethyldodecylphosphonium hydroxide, naphthyldimethylhexadecylphosphonium hydroxide, tributylhexadecylphosphonium chloride, benzylmethylhexadecyloxonium chloride, benzylethyldodecyloxonium chloride, naphthylpropyldecyloxonium hydroxide, dibutyldodecyloxonium chloride, phenylmethyldodecyloxonium chloride, phenylmethyldodecyloxonium chloride, dipropylhexadecyloxonium chloride, dibutylhexadecyloxonium hydroxide, benzylmethylhexadecylsulfonium chloride, diethyldodecylsulfonium chloride, naphthylpropylhexadecylsulfonium hydroxide, benzylbutyldodecylsulfonium chloride, phenylmethylhexadecylsulfonium chloride, dimethylhexadecylsulfonium chloride, benzylbutyldodecylsulfonium hydroxide, benzyldiethyldodecylarsonium chloride, benzyldiethyldodecylstibonium chloride, trimethyldodecylarsonium chloride, trimethyldodecylstibonium chloride, benzyldibutyldecylarsonium chloride, benzyldibutyldecylstibonium chloride, tributylhexadecylarsonium chloride, tributylhexadecylstibonium chloride, naphthylpropyldecylarsonium hydroxide, naphthylpropyldecylstibonium hydroxide, benzylmethylhexadecylarsonium chloride, benzylmethylhexadecylstibonium chloride, benzylbutyldodecylarsonium hydroxide, benzylbutyldodecylstibonium hydroxide, benzyldimethyldodecylammonium hydroxide, benzyldimethyltetradecylammonium hydroxide, benzyldimethylhexadecylammonium hydroxide, benzyldimethyloctadecylammonium hydroxide, dimethylcyclohexyloctylammonium hydroxide, diethylcyclohexyloctylammonium hydroxide, dipropylcyclohexyloctylammonium hydroxide, dimethylcyclohexyldecylammonium hydroxide, diethylcyclohexyldecylammonium hydroxide, dipropylcyclohexyldecylammonium hydroxide, dimethylcyclohexyldodecylammonium hydroxide, diethylcyclohexyldodecylammonium hydroxide, dipropylcyclohexyldodecylammonium hydroxide, dimethylcyclohexyltetradecylammonium hydroxide, diethylcyclohexyltetradecylammonium hydroxide, dipropylcyclohexyltetradecylammonium hydroxide, dimethylcyclohexylhexadecylammonium hydroxide, diethylcyclohexylhexadecylammonium hydroxide, dipropylcyclohexylhexadecylammonium hydroxide, dimethylcyclohexyloctadecylammonium hydroxide, diethylcyclohexyloctadecylammonium hydroxide, dipropylcyclohexyloctadecylammonium hydroxide, as well as the corresponding fluoride, chloride, bromide, iodide, sulfate, nitrate, nitrite, phosphate, acetate, citrate and tartrate compounds.

The preferred onium compounds are the quaternary ammonium compounds and of those especially preferred are the halide salt, i.e., chloride, bromides, iodides and fluorides. Especially preferred quaternary ammonium compounds are benzyldimethyldodecylammonium chloride, benzyldimethyltetradecylammonium chloride, benzyldimethylhexadecylammonium chloride and benzyldimethyloctadecylammonium chloride. The concentration of the onium compound in the aqueous solution can vary from about 0.1 to about 10,000 ppm, preferably from about 1 to about 1,000 and most preferably from about 5 to about 500 ppm.

Sweetening of the sour hydrocarbon fraction is effected by oxidation of mercaptans. Accordingly, an oxidizing agent is necessary for the reaction to proceed. Air is a preferred oxidizing agent, although oxygen or other oxygen-containing gases may be used. At least a stoichiometric amount of oxygen (relative to the concentration of mercaptans) is required to oxidize the mercaptans to disulfides, although an excess amount of oxygen is usually employed. In some cases the sour hydrocarbon fraction may contain entrained air or oxygen in sufficient concentration to accomplish the desired sweetening, but generally it is preferred to introduce air into the reaction zone.

Sweetening of the sour hydrocarbon fraction may be effected in any suitable manner well known in the art and may be in a batch or continuous process. In a batch process the sour hydrocarbon fraction is introduced into a reaction zone containing the aqueous solution which contains the metal chelate, the onium compound and ammonium hydroxide. Air is introduced therein or passed therethrough. Preferably the reaction zone is equipped with suitable stirrers or other mixing devices to obtain intimate mixing. In a continuous process the aqueous solution containing the metal chelate catalyst, ammonium hydroxide and the onium compound is passed countercurrently or concurrently with the sour hydrocarbon fraction in the presence of a continuous stream of air. In a mixed type process, the reaction zone contains the aqueous solution, metal chelate ammonium hydroxide and onium compound, and gasoline and air are continuously passed therethrough and removed generally from the upper portion of the reaction zone. For specific examples of apparatus used to carry out a liquid/liquid process, see U.S. Pat. Nos. 4,019,869, 4,201,626 and 4,491,565 and 4,753,722 which are incorporated by reference.

In general the process is usually effected at ambient temperatures, although elevated temperatures may be employed and generally will be in the range of from about 100° to about 400° F., depending upon the pressure utilized therein, but usually below that at which substantial vaporization occurs. Pressures of up to about 1,000 psi or more are operable although atmospheric or substantially atmospheric pressures are suitable.

Although all the salts of the onium compounds can work in the instant invention, it has been found that the halide salts and particularly the chloride salts have greater activity than the hydroxide salt. Without wishing to be bound by a particular mechanism, we propose the following mechanism to explain the unexpected results of the onium halide salts. For convenience only, the mechanism will be set forth using quaternary ammonium halide salts as the onium halide salt. This unexpected result is believed to be owing to the way in which the quaternary ammonium halide (hereinafter exemplified by the chloride salt) interacts with the metal chelate, in particular the sulfonated metal phthalocyanines which are usually employed in the form of the ammonium salt. In the proposed mechanism a complex of a quaternary ammonium ion and a sulfonated cobalt phthalocyanine is the site of mercaptan (or mercaptide) oxidation. This complex can exist entirely in the water phase, in the oil phase or at the interface between the water and oil phases. This complex is a redox catalyst which causes oxidation of mercaptan (mercaptide) and reduction of oxygen. It is believed that this complex is most catalytically effective when it is in the oil phase rather than in the water phase or at the interface. Finally, this complex is believed to be most effectively solubilized into the oil phase when a quaternary ammonium halide rather than a quaternary ammonium hydroxide is used. This increased solubility is best understood in the following terms: when the quaternary ammonium halide and the metal phthalocyanine interact to form the oil soluble complex an ammonium salt, (the metal phthalocyanine is added as an ammonium salt) is left behind in the water phase. When a quaternary ammonium chloride is used this salt is ammonium chloride which is well-ionized and very soluble in water. However, when a quaternary ammonium hydroxide is used ammonium hydroxide would be left behind in water, but ammonium hydroxide is not appreciably ionized in water and is best represented as hydrated ammonia. This ammonium hydroxide would be added to the ammonium hydroxide added for basicity with the net result being decreased solubility of the ammonium hydroxide, derived from the formation of the complex, in the water phase. This has the effect of inhibiting the quaternary halide/metal phthalocyanine complex from migrating into the oil phase.

In summary, a mechanism is proposed for mercaptan oxidation in which an oil soluble onium salt/metal phthalocyanine complex is the active catalyst species. Increasing the solubility of this complex in the oil (gasoline) phase increases the catalytic activity of the system. This solubility is highest when an onium halide is used instead of an onium hydroxide. Based on this mechanism, it is anticipated that the nitrate, sulfate, phosphate, acetate, citrate and tartrate would have increased activity versus the hydroxide although not as much as the halide salts.

The catalyst which has been described herein, i.e., an aqueous solution containing a metal chelate, ammonium hydroxide and an onium compound can also be used to improve the activity of a fixed bed mercaptan oxidation catalyst. Fixed bed processes to sweeten hydrocarbon fractions are well known in the art and comprise a metal chelate dispersed on a solid support such as activated charcoal. The support may also have dispersed thereon an onium compound as described above. The process is carried out in a similar manner to the liquid-liquid process. That is, the sour hydrocarbon fraction is contacted with the catalyst in the presence of an oxidizing agent and a basic component which is an alkali metal hydroxide, e.g., sodium-hydroxide, or ammonium hydroxide at sweetening conditions to oxide the mercaptans to disulfides. Detailed information on fixed bed catalysts and process is found in U.S. Pat. Nos. 4,913,802; 4,908,122 and 4,824,818 which are incorporated by reference.

The fixed bed catalyst has a tendency to deactivate over a period of time and therefore it is desirable to improve its activity instead of replacing the catalyst. Applicants have found that the activity of the fixed bed catalyst can be improved by adding small amounts of the catalyst which is used in the liquid-liquid process described in the instant application. The only difference between the aqueous solution which is used in the liquid/liquid system and that which is used to increase the activity of a fixed bed catalyst is that in the latter case, the concentration of the onium compound varies from about 0.1 to about 30 weight percent. The addition can be continuous or intermittent, although continuous is preferred. The amount of aqueous solution, i.e., catalyst which is to be added is from about 5 to about 10,000 ppm and preferably from about 10 to about 5,000 ppm. The effect of adding this solution is that the life of the fixed bed catalyst is appreciably extended.

The following examples are presented in illustration of this invention and are not intended as undue limitations on the generally broad scope of the invention as set out in the appended claims.

EXAMPLE 1

A stirred contactor which consisted of a cylindrical glass container measuring 3.5 inches in diameter by 6 inches high and which contained 4 baffles that are at 90° angles to the side walls was used. An air driven motor was used to power a paddle stirrer positioned in the center of the apparatus. When turning, the stirrer paddles passed within ⅛" of the baffles. This resulted in a very efficient, pure type of mixing.

To the above apparatus there were added 400 mL of a gasoline which contained 56 wppm of mercaptan as mercaptan sulfur, 10 mL of an aqueous solution containing 4 weight percent $NH_3$ and 600 ppm of sulfonated cobalt phthalocyanine (a mixture of the mono, di, tri and tetra substituted). To this mixture an amount of a quaternary ammonium compound was added and the mixture was stirred. Periodically stirring was stopped and a sample was withdrawn from the gasoline layer with a pipette and analyzed for mercaptan by titration.

The above experiment was repeated four times with two types of quaternary ammonium salts and varying concentrations. Whether the chloride or hydroxide salt was used, the quaternary ammonium compound was a mixture of dimethylbenzylalkyl with a minor amount of methylbenzyldialkyl compounds, with the alkyl groups varying in chain length from about $C_{12}$ to about $C_{18}$. These results are presented in Table 2.

TABLE 2

| Quaternary Ammonium Compound | Concentration (wppm) | Amount of Mercaptan (wppm) Remaining at Stated Time (mins) | | | | |
|---|---|---|---|---|---|---|
| | | 3 | 6 | 10 | 15 | 20 |
| None | 0 | 30 | 27 | 23 | 21 | 17 |
| Quat$^+$ OH$^-$ | 72 | 23 | 15 | 11 | 8 | 8 |
| Quat$^+$ OH$^-$ | 144 | 17 | 5 | 2 | 2 | 1 |
| Quat$^+$ Cl$^-$ | 25 | 19 | 5 | 2 | 2 | 2 |

These results clearly indicate that first even ammonium hydroxide by itself has some ability to promote sweetening. Secondly, the use of a quaternary ammonium hydroxide greatly accelerates the oxidation of mercaptans. Finally, the use of a quaternary ammonium chloride promotes the oxidation at a greater rate than the quaternary ammonium hydroxide. That is, a much lower concentration of the chloride salt is needed to provide the same level of sweetening as a higher concentration of the hydroxide salt.

We claim as our invention:

1. A catalyst effective in oxidizing mercaptans contained in a sour hydrocarbon fraction to disulfides consisting of ammonium hydroxide, a metal chelate and an onium compound in an aqueous solution, the onium compound selected from the group consisting of quaternary ammonium, phosphonium, arsonium, stibonium, oxonium and sulfonium compounds having the formula, $$[R'R''R_yM]^+X^-$$

where R is a hydrocarbon group containing up to about 20 carbon atoms and selected from the group consisting of alkyl, cycloalkyl, aryl, alkaryl, and aralkyl, R' is a straight chain alkyl group containing from about 5 to about 20 carbon atoms, R'' is a hydrocarbon group selected from the group consisting of aryl, alkaryl and aralkyl, M is nitrogen, phosphorus, arsenic, antimony, oxygen or sulfur, X is an anion selected from the group consisting of halide, nitrate, sulfate, phosphate, acetate, citrate and tartrate, and y is 1 when M is oxygen or sulfur and y is 2 when M is phosphorus, arsenic, antimony or nitrogen.

2. The catalyst of claim 1 where the ammonium hydroxide is present in a concentration from about 0.1 to about 30 weight percent of the solution.

3. The catalyst of claim 1 where the metal chelate is a metal phthalocyanine.

4. The catalyst of claim 3 where the metal phthalocyanine is a cobalt phthalocyanine and is present in a concentration from about 0.1 to about 2000 ppm.

5. The catalyst of claim 1 where the onium compound is present in a concentration from about 0.1 to about 10,000 ppm.

6. The catalyst of claim 1 where the onium compound is a quaternary ammonium compound.

* * * * *